United States Patent [19]

Spirkowyc et al.

[11] Patent Number: 5,215,337
[45] Date of Patent: Jun. 1, 1993

[54] CONTAINMENT PIPING SYSTEM WITH EXPANSION SEAL

[76] Inventors: Paul A. Spirkowyc, 6100 Creekbend Dr.; Terry R. McPherson, 10807 Tree Bark Dr., both of Charlotte, N.C. 28226

[21] Appl. No.: 669,162

[22] Filed: Mar. 14, 1991

[51] Int. Cl.⁵ .............................................. F16L 47/00
[52] U.S. Cl. ................................ 285/133.1; 285/305; 285/373; 285/423; 285/906; 285/915
[58] Field of Search ................ 285/373, 419, 104, 105, 285/305, 403, 187, 133.1, 423, 906, 915

[56] References Cited

U.S. PATENT DOCUMENTS

| | | | |
|---|---|---|---|
| 2,449,795 | 9/1948 | Stillwagon | 285/373 X |
| 2,463,235 | 3/1949 | Andrews | 285/373 X |
| 2,846,240 | 8/1958 | Beyer | 285/105 X |
| 3,116,078 | 12/1963 | Scherer | 285/373 X |
| 3,334,929 | 8/1967 | Wiltse | 285/305 |
| 4,429,907 | 2/1984 | Timmons | 285/373 |
| 4,707,000 | 11/1987 | Torgardh | 285/305 |
| 4,729,582 | 3/1988 | Zeidler | 285/373 |
| 4,768,813 | 9/1988 | Timmons | 285/373 |
| 4,869,534 | 9/1989 | Ketcham et al. | 285/305 X |
| 4,870,856 | 10/1989 | Shorp | 285/373 X |
| 4,923,350 | 5/1990 | Hinksman et al. | 285/305 X |

Primary Examiner—Dave W. Arola
Attorney, Agent, or Firm—Ralph H. Dougherty

[57] ABSTRACT

A plastic pipe seal for dual wall plastic pipe includes a plastic single piece or multi-piece fitting formed of rigid plastic sheet. At each inlet to the fitting, two formed grooves are radial to the line of flow through the fitting. The groove closest to the fitting inlet mates with a corresponding groove on the pipe, which groove receives a mechanical retainer. A second radial groove spaced from the retaining groove holds a gasket sealing device which provides a seal between the inside of the fitting and the outside diameter of the pipe. The retainer can be an extruded or molded plastic or metal spring cut to appropriate size, or a dual durometer structure, which allows for compression to a solid retainer.

26 Claims, 3 Drawing Sheets

CONTAINMENT PIPING SYSTEM WITH EXPANSION SEAL

FIELD OF THE INVENTION

The present invention relates to a seal and joint system for connecting plastic pipe, and more particularly to an apparatus and method for providing an expansion seal for a joint system for connecting dual wall plastic pipe.

BACKGROUND OF THE INVENTION

Heretofore compensation for expansion and contraction due to temperature changes within plastic piping systems has been accomplished by using expansion joints or offset loops. While these techniques are acceptable for use in single wall piping systems, with the advent of "double wall piping" systems (i.e., double containment or dual containment piping), compensation for material expansion and contraction has required other solutions. Ziu U.S. Pat. No. 4,786,088, describes the use of restraint couplings for controlling expansion and contraction in double wall piping systems of similar materials. This system is unsuitable for dissimilar materials due to a lack of acceptable joining techniques. Other systems by Plexco (Chevron), George Fisher, and Asahi (as well as Ziu) recommend the use of expansion loops which are both costly and inadequately address the problem of expansion of dissimilar materials.

Standard bellows or piston type expansion joints are not suitable for double wall piping systems due to space limitations of the containment or outer pipe.

DESCRIPTION OF RELATED ART

Applicants are aware of the following U.S. Patents concerning sealing of plastic pipe joints.

| U.S. Pat. No. | Inventor | Title |
| --- | --- | --- |
| 4,223,896 | Ström | SEALING RING |
| 4,341,392 | van Dongeren | PLASTICS PIPE HAVING WALLS WITH LENGTHWISE EXTENDING CHANNELS |
| 4,368,894 | Parmann | REINFORCED SEALING RINGS FOR PIPE JOINT |
| 4,666,165 | Nordin | SEALING RING WITH PORTIONED LOCKING ELEMENTS |
| 4,690,414 | Haaland | MEANS FOR SEALING THE GAP BETWEEN TWO AXIALLY DISPLACEABLE SEALING SURFACES |
| 4,723,441 | Sweeney | PIPING SYSTEM FOR HAZARDOUS FLUIDS |
| 4,779,652 | Sweeney | UNITARY DOUBLE WALL PIPING SYSTEM |
| 4,786,088 | Ziu | DOUBLE-CONTAINMENT THERMOPLASTIC PIPE ASSEMBLY |
| 4,925,218 | Kunz et al. | DOUBLE-WALLED PIPELINE SYSTEM |

Ström teaches a sealing ring 13 or gasket having dual hardness. The two portions 15 and 16 are different types of rubber or thermoplastics with different durometers. The seal fits into a recess 12 in the outer pipe.

Van Dongeren teaches a dual-walled plastic pipe with integral bell-shaped connector with a seal 19 in annular groove 16.

Parmann teaches a pipe connector seal which appears to fit in mating grooves, as best seen in FIG. 3.

Sweeney '652 teaches a double-walled piping system but fails to teach any connector mechanism.

Sweeney '441 teaches dual walled pipe with seals which fail to provide for expansion, particularly linear expansion.

Nordin teaches a sealing ring for a pipe joint with a gap in the sealing ring.

Haaland teaches a Z-shaped gasket for sealing between two pipes.

Kunz teaches a doubled wall piping system. The Tee's are shell type with upper and lower halves which fit together similarly.

Ziu recognizes that he has inadequately provided for thermal expansion toward the fittings, and attempts to overcome this shortcoming by providing an expansion loop, or by providing concentric reducers, while warning that careful selection of dimensions of the containment elbow is required.

SUMMARY OF THE INVENTION

The invention involves a new system which will allow for expansion and contraction at each joint of the piping system. The invention provides plastic pipe seal apparatus for dual wall plastic pipe, including a plastic single-piece fitting, or multi-piece fitting having an outer shell formed of a pair of mirrored halves of rigid plastic sheet joined together with a seal gasket between the two halves. At each inlet to the fitting, two formed grooves are radial to the line of flow through the fitting. The groove closest to the fitting inlet mates with a corresponding groove on the pipe, which groove receives a mechanical retainer. A second radial groove spaced from the retaining groove holds a gasket sealing device which provides a seal between the inside of the fitting and the outside diameter of the pipe. The retainer can be an extruded or molded plastic spring cut to appropriate size, a dual durometer structure which allows for compression to a solid retainer, or a metal spring. Expansion and contraction is compensated at each joint through the fit of the mechanical retainer within the retainer groove. The retainer and pipe joint allow for expansion and contraction at each end of the fitting within the system. Typically movement of ¼ to ½ inch of the joint is possible. By varying the configuration of the retainer, more or less movement may be accommodated.

The subject invention is particularly useful in connecting above-ground drainage piping as well as for either above or below ground high pressure applications wherein the material in the pipe is pumped, and thus is at a pressure above or substantially above ambient. It is equally suited to above-ground and suspended piping systems, as well as below-ground and buried piping systems.

OBJECTS OF THE INVENTION

The principal object of the invention is to provide an improved joint and seal means for pipe.

Another object of this invention is to provide a moveable mechanical sealing joint for use in double walled piping systems.

A further object of this invention is to provide a low cost mechanical pipe joint which provides allowance for expansion and contraction.

Another object of the invention is to provide a dual-wall pipe joint that is easy to assemble.

Another object of the invention is to provide a dual-wall pipe joint that can be installed with minimal training of the installing personnel.

Another object of the invention is to provide a dual-wall pipe that allows the use of dissimilar plastic materials in a dual containment system without compromise of expansion and contraction design considerations.

BRIEF DESCRIPTION OF THE DRAWINGS

The foregoing and other objects will become more readily apparent by referring to the following detailed description and the appended drawings in which.

DETAILED DESCRIPTION

The invention is a mechanical joining system which includes expansion and contraction allowance for pipe and pipe fittings, and which is suitable for use with either solid (one piece) or split (multi-piece) fittings.

Figure 1:
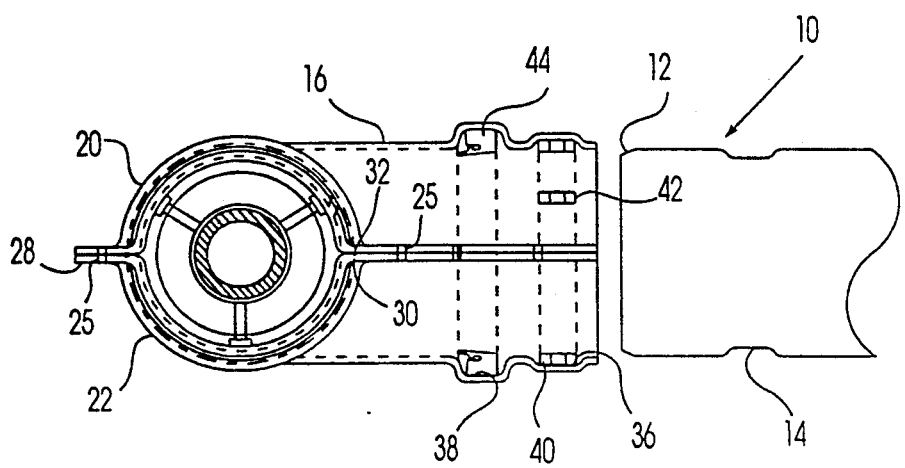
FIG. 1 is a side view of a dual containment elbow with pipe to be attached spaced therefrom.
Figure 2:
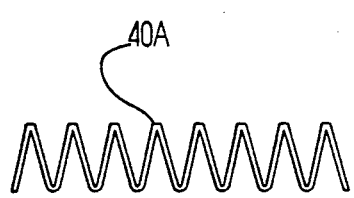
FIG. 2 is a cross-section of a spring retainer.
Figure 3:
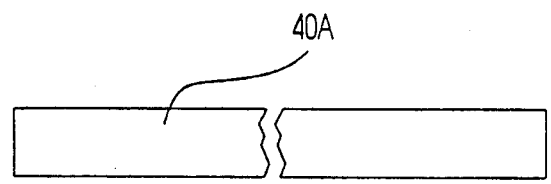
FIG. 3 is a side view of the spring retainer of FIG. 2.
Figure 7:
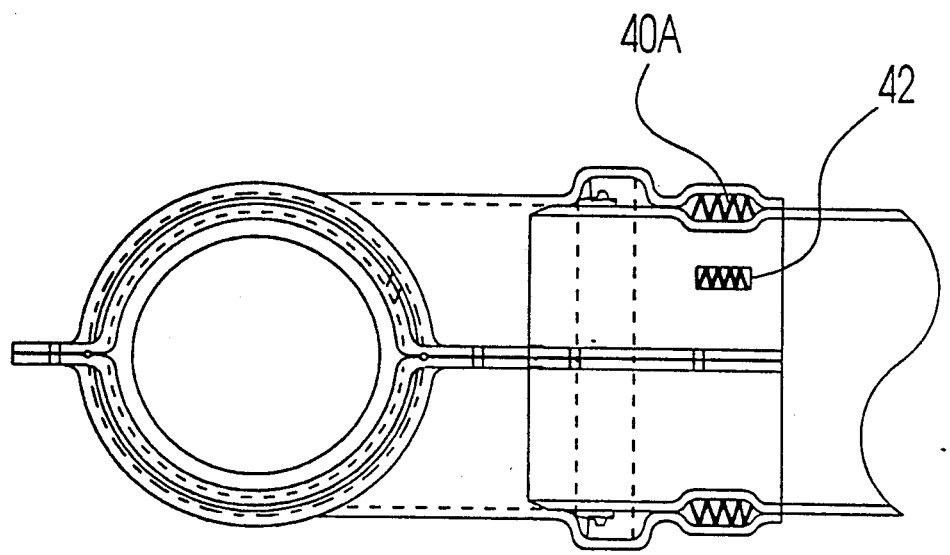
FIG. 7 is a side view with parts broken away of the dual containment elbow of FIG. 1 with pipe attached thereto, utilizing the spring retainer of FIG. 2.

Referring now to the drawings, and particularly to FIG. 1, wherein a multi-piece or split fitting is depicted, a section of plastic pipe 10 with beveled leading edge 12 and a mechanical cut or rolled groove 14 is joined to a plastic fitting 16. (Note: The fitting 16 is shown as a 90° coupling, but it can be a tee, 45° coupling, straight coupling, reducer fitting, or other configuration). Two (2) mirrored halves 20, 22 of rigid plastic sheet, such as PVC, form the outer shell of the fitting. This shell can be fabricated, molded or formed by a variety of commercial processes. The most common fabrication processes are sheet forming, injection or compression molding, or thermoforming. The two (2) halves of the fitting are joined together with stainless steel nuts, bolts, and washers. These fasteners are located in holes 25 along an outer flanged surface 28 running along the perimeter of the fitting at the sealing surface. The seal between the two (2) fitting halves is formed by a grooved section 30 running the length of both fitting halves. An elastomeric sealing gasket 32 is situated within the groove. At each inlet to the fitting, two other formed grooves 36, 38 are established radial to the line of flow through the fitting. The first groove 36 (closest to the fitting inlet) receives an elongated mechanical retainer 40. Matching groove 14 on the pipe 10, the retaining groove 36 formed on the fitting has a hole 42 cut through one section 20, 22 to allow the retaining device 40 to be inserted in grooves 36, 14 between the inside diameter of the fitting 16 and the outside diameter of the pipe 10. A second radial groove 38 spaced from the retaining groove 36 is formed in the split fitting halves. Positioned in this groove is a gasket sealing device 44 which provides a seal between the inside of the encasement fitting 16 and the outside diameter of the pipe 10. The sealing surface of the sealing device allows the pipe 10 to move fore and aft of the flow direction while maintaining a seal. Gasket 44, shown in FIG. 1, which is preferred for high pressure applications, tends to open or spread as shown in FIG. 1 to prevent outflow past the gasket when under pressure from the interior of the pipe 10, yet as shown in FIG. 7, the gasket 44 remains in sliding contact with the exterior surface of pipe 10, to accommodate expansion and contraction. Groove 14 is located a sufficient distance from the beveled leading edge 12 of the pipe 10 that the leading edge 12 will extend beyond the gasket 44, preferably about ½ to 2 inches, when the joint is assembled.

Figure 8:
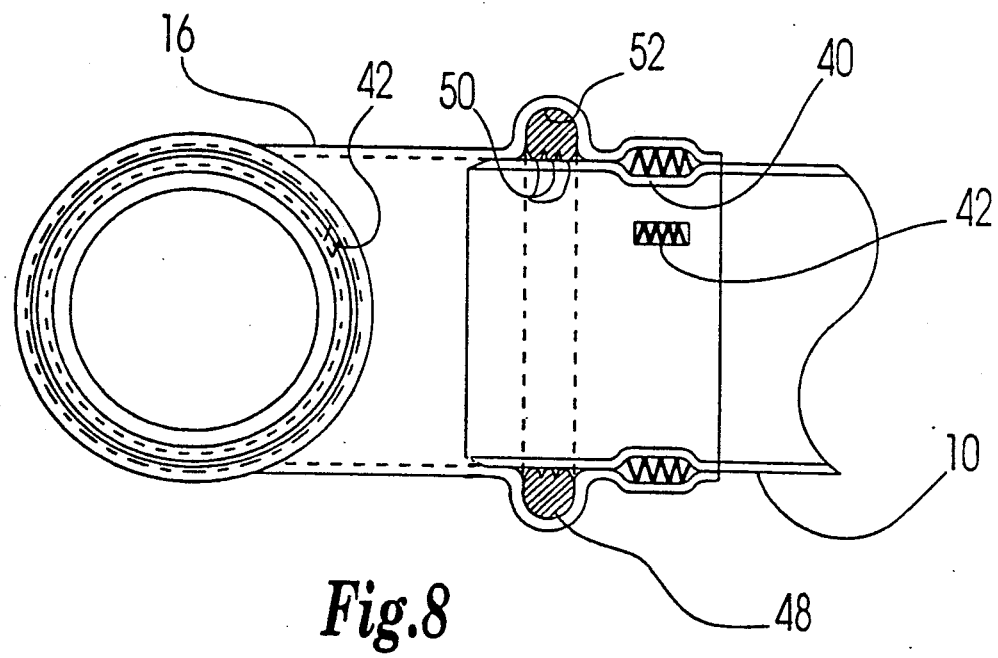
FIG. 8 is an alternative embodiment of the dual containment elbow of FIG. 1 which is a solid single piece elbow shown connected to a pipe, and further shows a low-pressure gasket arrangement.

The gasket can be any of a multitude of different types. Gasket 44 is for high pressure. A low pressure gasket 48 is depicted in FIG. 8 for such applications as drainage pipes. The gasket 48 is similar to an 0-ring having three interior ridges 50. The gasket groove 52 in shell 16 can be modified to accommodate any desired gasket configuration.

The gasket materials used between the split fittings 20,22 and surrounding the pipe 10 may be molded or extruded from a variety of elastomeric compounds. Typical materials are ethylene propylene rubber (EPDM), or Teflon. Other suitable gasket materials are polytetrafluorethylene (PTFE), nitrile rubber (NBR), butyl rubber, chloroprene rubber (CR), fluorine rubber (FPM), chlorine sulphonyl polyethylene (CSM), per fluoro (ethylenepropylene) copolymer (FEP), and ethylene/chlorotrifluoroethylene copolymer (ECTFE).

The retaining device 40 has two main functions. First, the retainer provides a positive lock between the outside diameter of the pipe and the inside diameter of the fitting. Second, the retainer provides compression and expansion allowing the pipe and pipe fitting to move relative to each other while remaining locked together.

The retaining device 40 can have many configurations, and still be within the scope of this invention, as discussed below. The common factor is that all retainers have sideways compressibility, which allows for expansion and contraction of the pipe joined thereto.

Piping is normally in 20-foot sections with a joint at each end. In environments with a temperature variation of 100° F., there can be as much as two (2) inches expansion or contraction per 100 feet of length of PVC pipe. By placing joints every 20 feet, with each joint capable of ½ inch expansion absorption on each side of the joint, there is no movement of the ends of the pipe. The expansion is allowed because the retainer is compressible from side to side, particularly when it is the preferred embodiment of a spring type retainer. When a dual durometer retainer such as soft and hard plastics are used, again it can easily be compressed if it moves, no matter which direction the pipe moves whether in tension or compression.

The preferred, and probably the most practical retainer embodiment is an extruded or molded plastic or metal spring 40A cut to appropriate size for a specific fitting or joint. The molded plastic spring is made of polypropylene, nylon, or other plastic material, thus allowing for deformation when compressed. Other plastic materials suitable for the retainer spring are polypropylene (PP), polyethylene (PE), nylon, high density polyethylene (HDPE), ultra high molecular weight polyethylene (UHMW PE), ethylene vinyl acetate (EVA), polyphthalamide (PPA), and polysulfone. Suitable metal spring materials include alloy steels, including stainless steels and spring steels, monel and inconel. As best seen in FIG. 7, the spring is an elongated strip, corrugated into elongated pleats.

Figure 4:
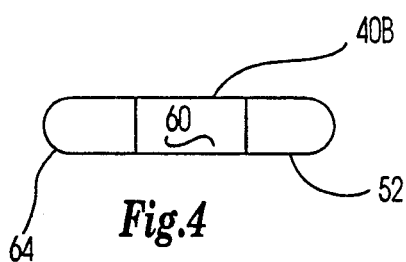
FIG. 4 is a cross-section of a dual durometer retainer.
Figure 5:
FIG. 5 is a side view of the alternative retainer embodiment of FIG. 4.
Figure 6:
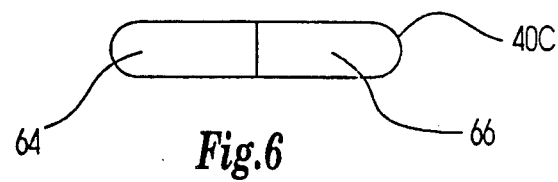
FIG. 6 is a cross-section of an alternative dual durometer retainer.

The second retainer embodiment 40B employs materials of different hardness (durometer), joined together to create a structure which allows for compression to a solid retainer. A dual durometer structure (FIG. 4) of soft rubber 62 on each side of a hard plastic or hard rubber center 60 provides a suitable retainer. Alternatively, a two material structure 40C (FIG. 6) may be employed, with soft material 64 and hard material 66 side-by-side. In either structure, the harder material can be selected from the group consisting of polypropylene (PP), polyethylene (PE), ultra high molecular weight polyethylene (UHMW PE), ethylene chlorotrifluoroethylene (ECTFE), ethylene tetrafluoroethylene (ETFE), polyvinylidene fluoride (PVDF), chlorotrifluoroethylene (CTFE), fluorinated ethylene propylene (FEP), perfluoroalkoxy (PFA), acrylonitrile-butadiene-styrene (ABS), chlorinated polyvinylchloride (CPVC), fiberglass reinforced vinyl ester, fiberglass reinforced epoxy, polyphenylene sulfide (PPS), polyphthalamide (PPA), fiberglass reinforced polyvinylchloride, and polysulfone. The softer material is advantageously selected from the group consisting of ethylene propylene rubber (EPDM), polytetrafluorethylene (PTFE), nitrile rubber (NBR), butyl rubber, chloroprene rubber (CR), fluorine rubber (FPM), chlorine sulphonyl polyethylene (CSM), perfluoro (ethylenepropylene) copolymer (FEP), and ethylene/chlorotrifluoroethylene copolymer (ECTFE).

The retainer must be constructed of a material which is resistant to chemical reaction with the material to be conveyed through the pipe. This protects the integrity of the retainer from spills around the pipe system assembly.

The pipe and fitting joint are assembled and function as follows:

A primary or carrier pipe (the central pipe shown in FIG. 1) is assembled in accordance with standard practices as specified by ASTM standards for joining pipe.

Support spacers (common to dual containment piping, as shown in FIG. 1 as well as by the Ziu patent) are attached at various intervals to locate and support the carrier pipe concentric to the containment or outer pipe.

The containment pipe with attached retainers is assembled over the carrier pipe. Note that expansion joints are not required for the carrier or primary pipe. Movement of the primary pipe is taken up by movement of the secondary pipe through use of the spring retainers located at each joint. However, in some underground installations, it may be necessary to include expansion joints within the carrier or primary pipe, due to soil or burial conditions in which friction on the outside of the containment pipe restricts its movement.

The gasket is placed within the groove 38 and the fitting shell is placed over the end of the pipe. Groove 14 on the pipe end is aligned with groove 36 of the fitting, and the retainer 40 is inserted into the groove through a small hole 42 in the exterior of the fitting, completing the connection.

As seen in FIG. 1, the width of groove 36 is slightly larger than the width of the retainer 40, allowing movement of the fitting fore and aft of the flow direction. Alternatively, when a spring-style retainer 40A is employed, the flexibility of the retainer similarly allows movement of the fitting. If soft material is used for the retainer, such movement is also allowed. The dual durometer retainer allows compression of the softer material, but the harder material holds its shape and prevents the retainer from moving out of the retainer groove.

The fitting shell is preferably made of rigid plastic sheet. Suitable plastic materials for the shell include polypropylene, (PP), polyethylene (PE), polyvinyl chloride (PVC), chlorinated polyvinyl chloride (CPVC), polyvinylidene fluoride (PVDF), ultra high molecular weight polyethylene (UHMW PE), ethylene chlorotrifluoroethylene (ECTFE), ethylene tetrafluoroethylene (ETFE), chlorotrifluoroethylene (CTFE), fluorinated ethylene propylene (FEP), perfluoroalkoxy (PFA), acrylonitrile-butadiene-styrene (ABS), fiberglass reinforced vinyl ester, fiberglass reinforced epoxy, polyphenylene sulfide (PPS), polyphthalamide (PPA), fiberglass reinforced polyvinylchloride, polysulfone, or any thermoplastic or thermosetting plastic material or composite.

Figure 9:
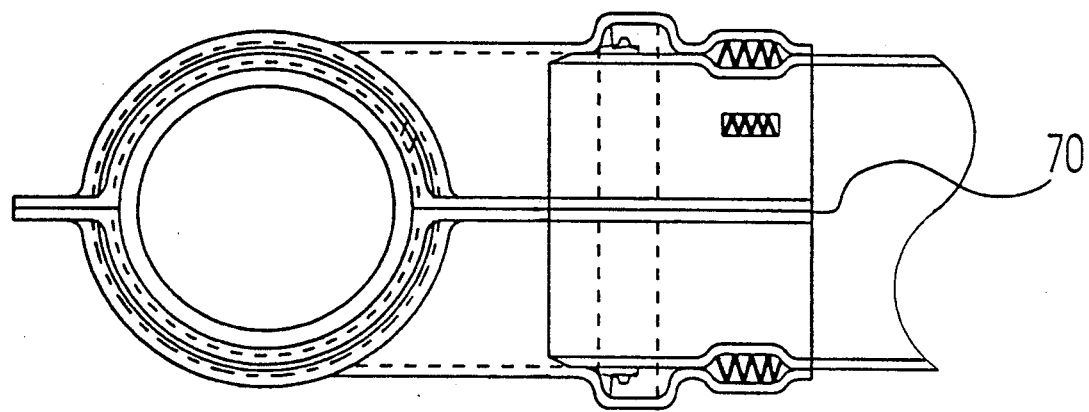
FIG. 9 is another alternative embodiment of the dual containment elbow of FIG. 1.

The embodiment of FIG. 9 shows two fitting shell halves connected or fixed together by heat bonding or by cementitious material along joining line 70.

Figure 10:
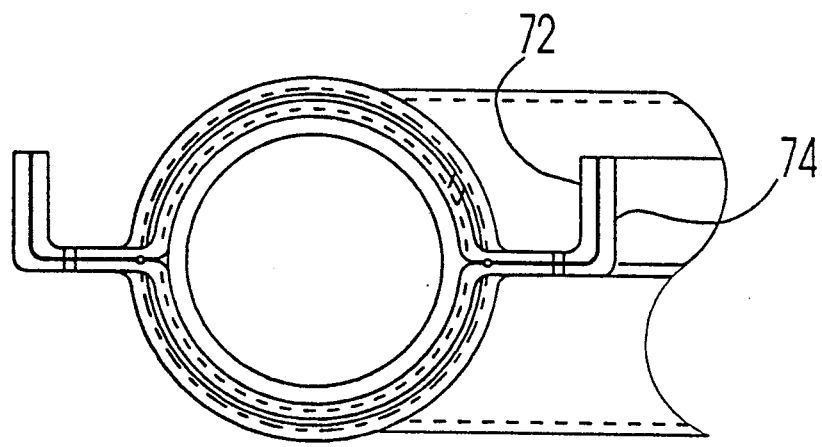
FIG. 10 is an alternative multi-piece dual containment elbow having nesting mating parts.

An alternative fitting shell shown in FIG. 10 has mating parts, with upwardly turned flanges 72,74, which increase both the fitting strength and the ease of assembly. They may be joined by any suitable technique as described above.

The entry end of the fitting shell may have a belled end for ease of access by the pipe end.

SUMMARY OF THE ACHIEVEMENT OF THE OBJECTS OF THE INVENTION

From the foregoing, it is readily apparent that I have invented an improved joint and seal means for pipe, particularly a moveable mechanical sealing joint for use in double walled piping systems, which is a low cost mechanical pipe joint providing allowance for expansion and contraction, is easy to assemble and which can be installed with minimal training of the installing personnel. The invention allows the use of dissimilar plastic materials in a dual containment system without compromise of expansion and contraction design considerations.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A mechanical sealing joint for double walled piping, comprising:
   a tubular shell having an inflow end and an outflow end;
   a first sealing groove and a second retaining groove within the shell at the inflow end of the shell, such grooves being radial to the line of flow through the shell, said retaining groove being provided with an access hole through said shell;
   a mechanical retainer positionable through said shell within the groove nearer the inflow end of the shell adapted for retaining a pipe insertable into said shell and the pipe having an exterior mating retaining groove therein, said retainer being compressible in the direction of the line of flow through said shell to allow limited movement of the pipe relative to the shell both fore and aft of the flow direction;
   a radially compressible gasket sealing device positioned within said second radial groove spaced from the retaining groove and adapted to provide a seal between the inside of the shell and the outside diameter of a pipe positioned in said shell and to maintain slidable contact therewith, thereby allowing the pipe to move fore and aft of the flow direction while maintaining a seal.

2. A mechanical sealing joint according to claim 1, wherein said tubular shell comprises a pair of mated halves of rigid plastic sheet, the halves being joined together in sealing relation.

3. A mechanical sealing joint according to claim 2, wherein said mated halves are provided with flanges which are fastened together with mechanical fasteners.

4. A mechanical sealing joint according to clam 3, wherein said mechanical fasteners are selected from the group consisting of bolts, rivets, screws, clips, and blind fasteners.

5. A mechanical sealing joint according to claim 3, wherein said flanges are provided with mating elongated grooves, and an elongated elastomeric sealing gasket is positioned in each elongated mated groove, thereby forming a seal between the two halves.

6. A mechanical sealing joint according to claim 2, wherein said mated halves are bonded together.

7. A mechanical sealing joint according to claim 6, wherein said mated halves are bonded together by heat fusion.

8. A mechanical sealing joint according to claim 6, wherein said mated halves are bonded together with cementitious material.

9. A mechanical sealing joint according to claim 1, wherein the material of said tubular shell is rigid plastic.

10. A mechanical sealing joint according to claim 1, wherein the material of said tubular shell is selected from the group consisting of fiberglass reinforced plastic, polypropylene, polyvinyl chloride, chlorinated polyvinyl chloride, polyvinylidene fluoride, vinyl esters, epoxy resins, polyethylene, ultra high molecular weight polyethylene, ethylene chlorotrifluoroethylene, ethylene tetrafluoroethylene, chlorortrifluoroethylene, fluorinated ethylene propylene, perfluoroalkoxy, acrylonitrile-butadiene-styrene, fiberglass reinforced vinyl ester, fiberglass reinforced epoxy, polyphenylene sulfide, polyphthalamide, fiberglass reinforced polyvinylchloride, polysulfone, thermoplastic and thermosetting plastic.

11. A mechanical sealing joint according to claim 1, wherein said mechanical retainer is chemically resistant to caustic materials.

12. A mechanical sealing joint according to claim 1, wherein the material of said gasket is selected from the group consisting of ethylene propylene rubber, polytetrafluorethylene, nitrile rubber, butyl rubber, chloroprene rubber, fluorine rubber, chlorine sulphonyl polyethylene, per fluoro (ethylenepropylene) copolymer, and ethylene/chlorotrifluoroethylene copolymer.

13. A mechanical sealing joint according to claim 1, wherein said mechanical retainer is a spring comprised of an elongated strip corrugated longitudinally into elongated pleats.

14. A mechanical sealing joint for double walled piping, comprising:
   a tubular shell having an inflow end and an outflow end;
   a first sealing groove and a second retaining groove at the inflow end of the shell, such grooves being radial to the line of flow through the shell;
   a mechanical retainer positionable within the groove nearer the inflow end of the shell adapted for retaining a pipe insertable into said shell and the pipe having an exterior mating retaining groove therein, said retainer being compressible in the direction of the line of flow through said shell to allow limited movement of the pipe relative to the shell both fore and aft of the flow direction, wherein said mechanical retainer is an elongated dual durometer composite of hard material and soft material;
   a gasket sealing device positioned within said second radial groove spaced from the retaining groove and adapted to provide a seal between the inside of the shell and the outside diameter of a pipe positioned therein, whereby the gasket sealing device allows the pipe to move fore and aft of the flow direction while maintaining a seal.

15. A mechanical sealing joint according to claim 14, wherein said dual durometer composite materials are soft rubber and a material selected from the group consisting of hard rubber and hard plastic.

16. A mechanical sealing joint according to claim 14, wherein said hard and soft materials are positioned side-by side.

17. A mechanical sealing joint according to claim 14, wherein said hard material is flanked by a softer material on each side.

18. A mechanical sealing joint according to claim 14, wherein said hard material is selected from the group consisting of fiberglass reinforced plastic, polypropylene, polyvinyl chloride, chlorinated polyvinyl chloride, polyvinylidene fluoride, vinyl esters, epoxy resins, polyethylene, ultra high molecular weight polyethylene, ethylene chlorotrifluoroethylene, ethylene tetrafluoroethylene, chlorotrifluoroethylene, fluorinated ethylene propylene, perfluoroalkoxy, acrylonitrile-butadiene-styrene, fiberglass reinforced vinyl ester, fiberglass reinforced epoxy, polyphenylene sulfide, polyphthalamide, fiberglass reinforced polyvinylchloride, polysulfone, thermoplastic and thermosetting plastic.

19. A mechanical sealing joint according to claim 14, wherein said soft material is selected from the group consisting of ethylene propylene rubber, polytetrafluorethylene, nitrile rubber, butyl rubber, chloroprene rubber, fluorine rubber, perfluoro (ethylenepropylene) copolymer, ethylene/chlorotrifluoroethylene copolymer, and chlorine sulphonyl polyethylene.

20. A mechanical sealing joint for double walled piping, comprising:
- a tubular shell having an inflow end and an outflow end;
- a first sealing groove and second retaining groove at the inflow end of the shell, such grooves being radial to the line of flow through the shell;
- a mechanical retainer positionable within the groove nearer the inflow end of the shell adapted for retaining a pipe insertable into said shell and the pipe having an exterior mating retaining groove therein, said retainer being compressible in the direction of the line of flow through said shell to allow limited movement of the pipe relative to the shell both fore and aft of the flow direction, wherein said mechanical retainer is a plastic spring;
- a gasket sealing device positioned within said second radial groove spaced from the retaining groove and adapted to provide a seal between the inside of the shell and the outside diameter of a pipe positioned therein, whereby the gasket sealing device allows the pipe to move fore and aft of the flow direction while maintaining a seal.

21. A mechanical sealing joint according to claim 20, wherein said plastic spring is made of a material selected from the group consisting of polypropylene and nylon.

22. A mechanical sealing joint according to claim 20, wherein said mechanical retainer is a molded plastic spring.

23. A mechanical sealing joint according to claim 20, wherein said mechanical retainer is an extruded plastic spring.

24. A mechanical sealing joint for double walled piping, comprising:
- a tubular shell having an inflow end and an outflow end;
- a first sealing groove and s second retaining groove at the inflow end of the shell, such grooves being radial to the line of flow through the shell;
- a mechanical retainer positionable within the groove nearer the inflow end of the shell adapted for retaining a pipe insertable into said shell and the pipe having an exterior mating retaining groove therein, said retainer being compressible in the direction of the line of flow through said shell to allow limited movement of the pipe relative to the shell both fore and aft of the flow direction, wherein said mechanical retainer is a spring comprised of an elongated strip corrugated longitudinally into elongated pleats;
- a gasket sealing device positioned within said second radial groove spaced from the retaining groove and adapted to provide a seal between the inside of the shell and the outside diameter of a pipe positioned therein, whereby the gasket sealing device allows the pipe to move fore and aft of the flow direction while maintaining a seal.

25. A mechanical sealing joint according to claim 24, wherein said mechanical retainer is a metal spring.

26. A mechanical sealing joint according to claim 25, wherein said mechanical retainer is made of spring material selected from the group consisting of alloy steels, stainless steels, spring steels, monel and inconel.

* * * * *